United States Patent
Matsuoka et al.

(10) Patent No.: US 10,536,001 B2
(45) Date of Patent: Jan. 14, 2020

(54) PHOTOVOLTAIC SYSTEM

(71) Applicant: TOSHIBA MITSUBISHI-ELECTRIC INDUSTRIAL SYSTEMS CORPORATION, Tokyo (JP)

(72) Inventors: Yuji Matsuoka, Tokyo (JP); Tatsuaki Ambo, Tokyo (JP); Naoki Fujiwara, Tokyo (JP); Paul Bixel, Salem, VA (US); Ryuta Saka, Campbell, CA (US)

(73) Assignee: Toshiba Mitsubishi-Electric Industrial Systems Corporation, Tokyo (JP)

( * ) Notice: Subject to any disclaimer, the term of this patent is extended or adjusted under 35 U.S.C. 154(b) by 120 days.

(21) Appl. No.: 15/349,158

(22) Filed: Nov. 11, 2016

(65) Prior Publication Data

US 2018/0138713 A1 May 17, 2018

(51) Int. Cl.
*H02J 3/38* (2006.01)
*H02J 3/18* (2006.01)

(52) U.S. Cl.
CPC ............. *H02J 3/383* (2013.01); *H02J 3/18* (2013.01)

(58) Field of Classification Search
None
See application file for complete search history.

(56) References Cited

U.S. PATENT DOCUMENTS

2015/0016160 A1* 1/2015 Tanaka ............... H02M 7/493
363/71
2016/0172864 A1 6/2016 Terazono et al.

FOREIGN PATENT DOCUMENTS

| JP | 2010-074989 A | 4/2010 |
|----|---------------|--------|
| JP | 2016-119745 A | 6/2016 |
| WO | WO 2013/145262 A1 | 10/2013 |
| WO | WO 2013/145263 A1 | 10/2013 |
| WO | WO 2015/029138 A1 | 3/2015 |

OTHER PUBLICATIONS

Notice of Reasons for Refusal issued by the Japanese Patent Office dated Nov. 7, 2019, for Japanese Patent Application No. 2018-550020.
First Office Action issued by the Chinese Patent Office dated Sep. 29, 2019, for Chinese Patent Application No. 2017-80052329.4.

* cited by examiner

*Primary Examiner* — Thienvu V Tran
*Assistant Examiner* — David M Stables
(74) *Attorney, Agent, or Firm* — Finnegan, Henderson, Farabow, Garrett & Dunner, L.L.P.

(57) ABSTRACT

A photovoltaic system includes photovoltaic cells, inverters, a reduced electricity output state determiner which determines whether each of the photovoltaic cells is in a reduced electricity output state, a first command value generator which generates a first command value for decreasing a first power factor of a first inverter determined as in the reduced electricity output state, a second command value generator which generates a second command value for increasing a second power factor of at least one of second inverters so as to compensate for output power of the first inverter, and a controller which controls the inverters.

9 Claims, 4 Drawing Sheets

PHOTOVOLTAIC SYSTEM

BACKGROUND OF THE INVENTION

1. Field of the Invention

Embodiments described herein relate generally to a photovoltaic system.

2. Description of the Related Art

In general, a photovoltaic system is known to convert direct-current (DC) power generated by a photovoltaic cell to alternating-current (AC) power and supply the AC power to an AC load. To convert DC power to AC power, an inverter is used.

In contrast, a power conversion system including a plurality of inverters in which the AC sides are connected in parallel is known. For example, it is disclosed that a plurality of inverters are controlled by separating them into a setting value less than a value obtained by dividing a power value required as the sum of the output power of each of the inverters by the number of inverters and a setting value greater than the above obtained value (see WO 2013/145262 A). For example, it is disclosed that the total output power of a plurality of inverters is controlled by adjusting the output power of each of the inverters in a control period shorter than a communication period between a controller and each inverter (see WO 2013/145263 A).

However, in a photovoltaic system, the electricity outputs of a plurality of photovoltaic cells may differ from each other. Therefore, if all of a plurality of inverters are controlled in the same manner at all times, the electricity output of the whole photovoltaic system may be reduced in comparison with the power which could be generated essentially because of a decrease in the electricity outputs of some of the photovoltaic cells.

BRIEF SUMMARY OF THE INVENTION

Embodiments described herein aim to provide a photovoltaic system which can prevent a decrease in the electricity output of the whole system even when the electricity outputs of some photovoltaic cells are reduced.

In accordance with one embodiment, a photovoltaic system includes photovoltaic cells; inverters corresponding to the photovoltaic cells, respectively; a reduced electricity output state determiner which determines whether each of the photovoltaic cells corresponding to the inverters is in a reduced electricity output state where an electricity output is less than a predetermined standard; a first command value generator which generates a first command value for decreasing a first power factor of a first inverter determined as in the reduced electricity output state out of the inverters by the reduced electricity output state determiner; a second command value generator which generates a second command value for increasing a second power factor of at least one of second inverters so as to compensate for output power of the first inverter controlled based on the first command value generated by the first command value generator; the second inverters being not determined as in the reduced electricity output state out of the inverters by the reduced electricity output state determiner; and a controller which controls the inverters based on the first command value generated by the first command value generator and the second command value generated by the second command value generator.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 2 is a structural diagram showing the structure of a controller according to the first embodiment.

DETAILED DESCRIPTION OF THE INVENTION

First Embodiment

Figure 1:
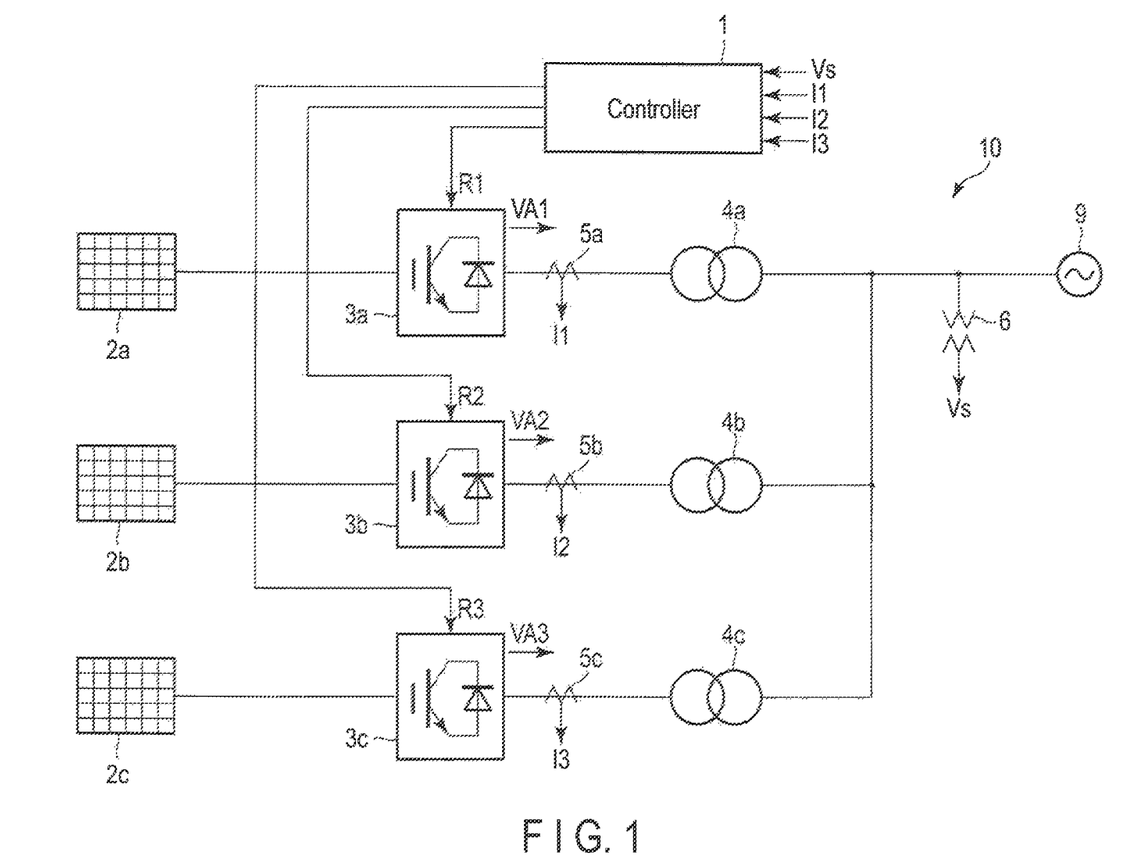
FIG. 1 is a structural diagram showing the structure of a photovoltaic system according to the first embodiment of the present invention.

FIG. 1 is a structural diagram showing the structure of a photovoltaic system 10 according to the first embodiment of the present invention. The same portions shown in the drawings are denoted by like reference numbers. Thus, the detailed explanation of such portions is omitted. Different portions are mainly explained.

The photovoltaic system 10 comprises a controller 1, three photovoltaic cells 2a, 2b and 2c, three inverters 3a, 3b and 3c, three interconnection transformers 4a, 4b and 4c, three AC current detectors 5a, 5b and 5c, and an AC voltage detector 6. Here, the photovoltaic system 10 comprises three inverters 3a to 3c. However, any number of inverters may be provided in the photovoltaic system 10 as long as the number of inverters is two or more.

The photovoltaic system 10 converts DC power generated by photovoltaic cells 2a to 2c to AC power which is used to interconnect a power system 9. The photovoltaic system 10 supplies power to the power system 9. For example, the photovoltaic system 10 is a mega solar system.

Photovoltaic cells 2a to 2c generate power from sunlight. Each of photovoltaic cells 2a to 2c may comprise any number of photovoltaic cell segments.

Inverters 3a to 3c convert DC power supplied from their respective photovoltaic cells 2a to 2c to AC power synchronized with the system voltage of the power system 9. Inverters 3a to 3c supply AC power to the power system 9 via their respective interconnection transformers 4a to 4c. For example, inverters 3a to 3c are power conditioners.

Interconnection transformers 4a to 4c are provided on the output side (AC side) of inverters 3a to 3c, respectively. Interconnection transformers 4a to 4c changes the AC voltage input from inverters 3a to 3c, respectively, to the system voltage of the power system 9.

AC current detectors 5a to 5c are provided on the output side of inverters 3a to 3c, respectively. AC current detectors 5a to 5c detect output currents I1, I2 and I3 of inverters 3a to 3c, respectively, and output the detected values to the controller 1 as detection signals.

The AC voltage detector 6 is provided on the output side of inverters 3a to 3c. The AC voltage detector 6 detects output voltage Vs of inverters 3a to 3c and outputs the detected value to the controller 1 as a detection signal. In place of only one AC voltage detector 6, a plurality of AC voltage detectors may be provided on the output side of inverters 3a to 3c, respectively. In this case, a structure similar to that of the present embodiment can be obtained by using the output voltage detected by each AC voltage detector for the control of corresponding inverter 3a, 3b or 3c in place of output voltage Vs detected by the AC voltage detector 6 of the present embodiment.

The controller 1 controls the output power of each of inverters 3a to 3c based on their respective output currents I1 to I3 detected by AC current detectors 5a to 5c, respectively, and output voltage Vs detected by the AC voltage detector 6 as the output voltage of inverters 3a to 3c.

FIG. 2 is a structural diagram showing the structure of the controller 1 according to the present embodiment.

The controller 1 comprises a reduced electricity output state determination unit 11, a command value generation unit 12 and a command value output unit 13.

The reduced electricity output state determination unit 11 determines whether the electricity output of photovoltaic cell 2a, 2b or 2c connected to its inverter is less than that of the other photovoltaic cells (this state is referred to as a reduced electricity output state) based on output voltage Vs of inverters 3a to 3c and output currents I1 to I3 of inverters 3a to 3c, respectively. The reduced electricity output state determination unit 11 transmits data including output voltage Vs of inverters 3a to 3c and output currents I1 to I3 of inverters 3a to 3c, respectively, as information, to the command value generation unit 12 along with a result of determination. For example, the reduced electricity output state is produced when the electricity output of one or some of photovoltaic cells 2a to 2c is reduced in comparison with a normal state (for example, fine weather) because of weather. For example, when photovoltaic cells 2a to 2c are partially covered by clouds, corresponding inverters 3a to 3c are in a reduced electricity output state. Hereinafter, this specification explains a case where only one of inverters 3a to 3c is determined as in a reduced electricity output state. However, any number of inverters 3a to 3c may be determined as in a reduced electricity output state except for all of the inverters.

For example, whether inverters 3a to 3c are in a reduced electricity output state is determined as follows. This specification explains a method of determining the reduced electricity output state of the first inverter 3a. However, this method is also applicable to the other inverters 3b and 3c. The reduced electricity output state determination unit 11 calculates the mean value of active elements (active currents) of all of output currents I1 to I3, or the mean value of active elements of output currents I2 and I3 other than output current I1 of the target inverter. When the active element of output current I1 of inverter 3a is less than the standard determined based on the calculated mean value, the reduced electricity output state determination unit 11 determines that inverter 3a is in a reduced electricity output state. For example, the standard determined based on the mean value may be a value obtained by subtracting a predetermined value from the mean value, or may be a value obtained by multiplying a proportion less than one by the mean value.

The reduced electricity output state may be determined in any way as long as it is possible to determine whether the active elements of output currents I1 to I3 of inverters 3a to 3c, respectively, are reduced. For example, any statistical value may be used in place of the above mean values. The electricity outputs of photovoltaic cells 2a to 2c when the weather is unsuitable for electricity generation (for example, when it is cloudy) may be set as the standard in advance in the reduced electricity output state determination unit 11. The reduced electricity output state determination unit 11 is capable of determining whether the active element of each of output currents I1 to I3 is reduced by comparing the active element of the output current with the standard set in advance.

The command value generation unit 12 generates command values R1, R2 and R3 for controlling the power factor of the output power of each of inverters 3a to 3c, respectively, based on the result of determination of the reduced electricity output state determination unit 11, output currents I1 to I3 of inverters 3a to 3c, respectively, and output voltage Vs of inverters 3a to 3c. Command values R1 to R3 may include a command value for controlling the active power or reactive power output from the respective inverters 3a to 3c. The command value generation unit 12 outputs generated command values R1 to R3 of inverters 3a to 3c to the command value output unit 13.

The command value output unit 13 outputs command values R1 to R3 to inverters 3a to 3c, respectively. In this manner, the output power of each of inverters 3a to 3c is controlled in accordance with their respective command values R1 to R3.

Now, this specification explains how command values R1 to R3 are obtained by the command value generation unit 12.

The explanation is begun with restrictions on command values R1 to R3.

The active power [W] output from each of inverters 3a to 3c is defined as P1, P2 and P3, respectively. The reactive power [Var] output from each of inverters 3a to 3c is defined as Q1, Q2 and Q3, respectively. The maximum output power [VA] determined by the specification of each of inverters 3a to 3c, such as the capacity, is defined as VA1max, VA2max and VA3max, respectively. The electricity outputs [W] of photovoltaic cells 2a to 2c supplying power to inverters 3a to 3a are defined as P1max, P2max and P3max, respectively. In this case, each active power P1 to P3 and each reactive power Q1 to Q3 output from inverters 3a to 3c, respectively, must satisfy the following relationships.

$$P1 \leq P1\text{max} \quad (1)$$

$$P2 \leq P2\text{max} \quad (2)$$

$$P3 \leq P3\max \quad (3)$$

$$\mathrm{sqrt}(P1^\wedge 2 + Q1^\wedge 2) \leq VA1\max \quad (4)$$

$$\mathrm{sqrt}(P2^\wedge 2 + Q2^\wedge 2) \leq VA2\max \quad (5)$$

$$\mathrm{sqrt}(P3^\wedge 2 + Q3^\wedge 2) \leq VA3\max \quad (6)$$

Here, "^" is an operator indicating the power of the value, and "sqrt( )" is a function for calculating the square root of the value in parentheses.

Hereinafter, this specification assumes that all of relationships (1) to (6) are always satisfied unless otherwise stated.

Figure 5:
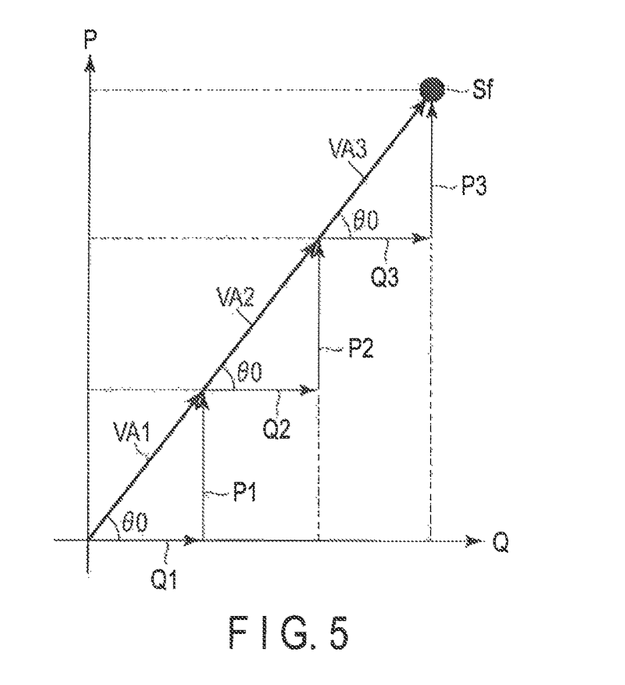
FIG. 5 is a vector diagram showing the output power of each inverter when no inverter is in a reduced electricity output state under control by the controller according to the first embodiment.
Figure 6:
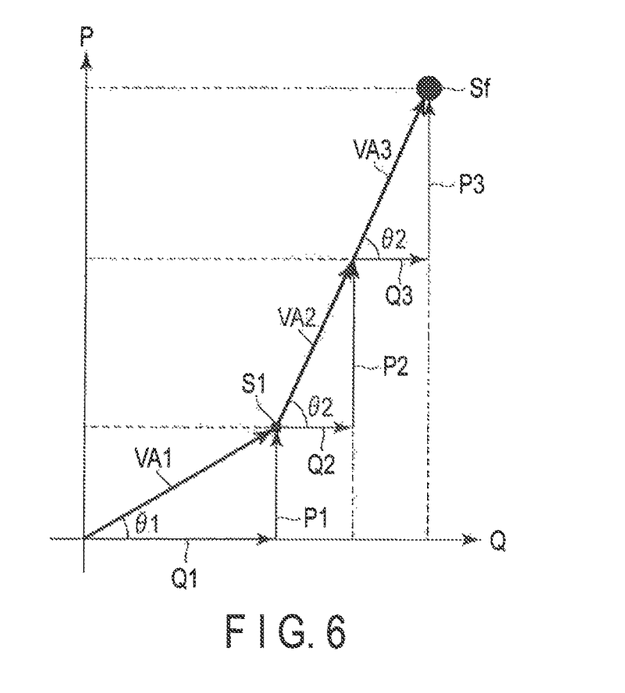
FIG. 6 is a vector diagram showing the output power of each inverter when one of the inverters is in a reduced electricity output state under control by the controller according to the first embodiment.

FIG. 5 is a vector diagram showing output power VA1, VA2 and VA3 [VA] of each of inverters 3a to 3c, respectively, when no inverter is in a reduced electricity output state under control by the controller 1 according to the first embodiment. FIG. 6 is a vector diagram showing output power VA1, VA2 and VA3 [VA] of each of inverters 3a to 3c, respectively, when inverter 3a is in a reduced electricity output state under control by the controller 1 according to the first embodiment. In the figures, power factors are shown by the angles of each output power VA1 to VA3 having vectors. When the power factor is 0, the angle is 0°. When the power factor is 1, the angle is 90°.

When no inverter is in a reduced electricity output state (in other words, when all of the inverters are in a normal state) as a result of determination of the reduced electricity output state determination unit 11, each output power VA1 to VA3 of inverters 3a to 3c, respectively, is controlled with the same power factor. Thus, in this case, each output power VA1 to VA3 has the same angle of θ0. Thus, the sum of each output power VA1 to VA3 of each of inverters 3a to 3c is also the power factor shown by an angle of θ0. This power factor is a power factor determined in advance and requiring supply to the power system 9.

When there is an inverter in a reduced electricity output state as a result of determination of the reduced electricity output state determination unit 11, the power factors of inverters 3a to 3c are determined as follows. This specification assumes that the electricity output is supplied excessively to the inverters which are not in a reduced electricity output state such that each active power is increased by the increase in the power factors.

This specification explains a case where the reduced electricity output state determination unit 11 determines that the first inverter 3a is in a reduced electricity output state. In this case, the command value generation unit 12 obtains command value R1 such that the power factor of the first inverter 3a is less than that in a normal state.

Figure 3:
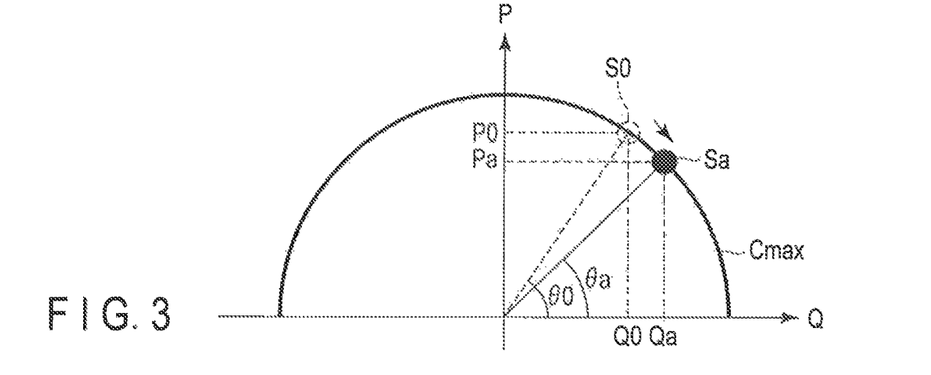
FIG. 3 is a vector diagram showing a method of obtaining command values by a command value generation unit when a power factor is decreased according to the first embodiment.
Figure 4:
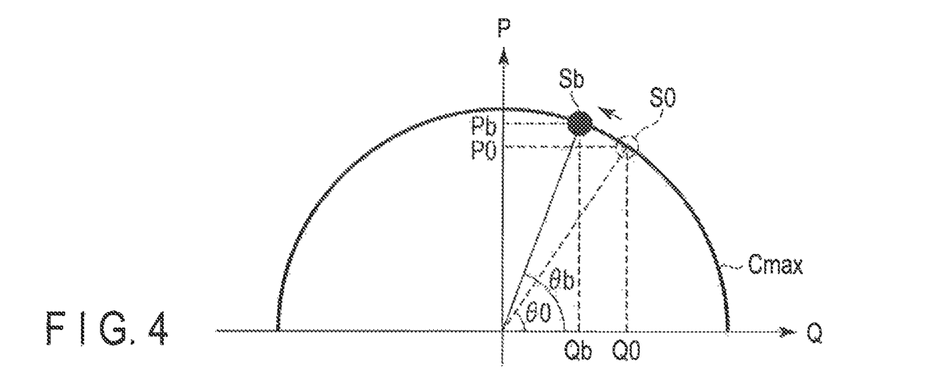
FIG. 4 is a vector diagram showing a method of obtaining command values by the command value generation unit when a power factor is increased according to the first embodiment.

FIG. 3 is a vector diagram showing a method of obtaining command values R1 to R3 by the command value generation unit 12 when a power factor is decreased. FIG. 4 is a vector diagram showing a method of obtaining command values R1 to R3 by the command value generation unit 12 when a power factor is increased. The semicircular curve Cmax shows the set of operational points of the maximum output power [VA] of each of inverters 3a to 3c.

The output power of the first inverter 3a in a normal state (when the first inverter 3a is not in a reduced electricity output state) is at operational point S0 in FIG. 3. The electricity output of photovoltaic cell 2a conforms to active power P1 output from the first inverter 3a. Assuming that the output from the first inverter 3a is decreased from active power P0 to active power Pa because of a decrease in electricity output of photovoltaic cell 2a, the command value generation unit 12 obtains operational point Sa which is active power Pa on the curve Cmax. The command value generation unit 12 obtains a power factor such that the output power of the first inverter 3a is at operational point Sa. At this time, the power factor is equivalent to angle θa shown in FIG. 3. The command value generation unit 12 generates command value R1 in conformity with the obtained power factor. By means of command value R1, the operational point of the output power of the first inverter 3a is transferred from operational point S0 to operational point Sa. The power factor of output power VA1 of the first inverter 3a is decreased from angle θ0 to angle θa. In this manner, the reactive power output from the first inverter 3a is increased by the decrease in the active power. The reactive power output from the first inverter 3a is increased from reactive power Q0 to reactive power Qa.

Each output power VA2 and VA3 of the second and third inverters 3b and 3c, respectively, which are not in a reduced electricity output state is controlled so as to compensate for the change in output power VA1 of the first inverter 3a. To perform this control, the command generation unit 12 obtains command values R2 and R3 such that the power factor of each of the second and third inverters 3b and 3c is greater than that in a normal state.

Each output power VA2 and VA3 of the second and third inverters 3b and 3c, respectively, in a normal state is at operational point S0 in FIG. 4. When each output power VA2 and VA3 of two inverters 3b and 3c, respectively, is controlled so as to be transferred from operational point S0 to operational point Sb on the curve Cmax, the command value generation unit 12 obtains the power factor of operational point Sb. At this time, the power factor is equivalent to angle θb shown in FIG. 4. The command value generation unit 12 generates command values R2 and R3 in conformity with the obtained power factor. By means of command values R2 and R3, the operational points of two inverters 3b and 3c are transferred from operational point S0 to operational point Sb. The power factors of two inverters 3b and 3c are increased from angle θ0 to angle θb. In this manner, the active power output from each of two inverters 3b and 3c is increased by the decrease in the reactive power. The active power output from each of two inverters 3b and 3c is increased from active power P0 to active power Pb.

Now, this specification explains the control applied to inverters 3a to 3c by the controller 1 when inverter 3a is in a reduced electricity output state with reference to FIG. 6.

The controller 1 performs control such that, even when inverter 3a in a reduced electricity output state is detected, operational point Sf which is the sum of each output power VA1 to VA3 of inverters 3a to 3c, respectively, is the same as operational point Sf of FIG. 5 before detection.

The controller 1 increases reactive power Q1 by the decrease in active power P1 by decreasing the power factor of inverter 3a in a reduced electricity output state from angle θ0 to angle θ1.

Subsequently, the controller 1 generates command values R2 and R3 to be used to compensate for the change by the cooperation of two inverters 3b and 3c, based on the difference between operational point S1 of output power VA1 of inverter 3a and operational point Sf, as the target, which is the sum of each output power VA1 to VA3. As shown in FIG. 6, when each power factor of output power VA2 and VA3 of two inverters 3b and 3c, respectively, is angle θ2, the sum of each output power VA1 to VA3 is at operational point Sf. The controller 1 generates command values R2 and R3 such that the power factors are set to angle θ2.

Command values R2 and R3 generated in the above manner are used to perform control such that each output power VA2 and VA3 of inverters 3b and 3c, respectively, which are not in a reduced electricity output state cooperates to compensate for output power VA1 of inverter 3a which is in a reduced electricity output state.

Specifically, reactive power Q1 is increased by the decrease in active power P1 by decreasing the power factor of output power VA1 of inverter 3a which is in a reduced electricity output state. In contrast, each active power P2 and P3 having redundant energy is increased by the decrease in each reactive power Q2 and Q3 by increasing the power factor of each output power VA2 and VA3 of inverters 3b and 3c, respectively, which are not in a reduced electricity output state.

In this manner, the controller 1 controls the active power element, reactive power element and power factor of the sum of each output power VA1 to VA3 of each of inverters 3a to 3c, respectively, so as to be a value (an operational point) which is substantially the same as that before the electricity output of photovoltaic cell 2a is reduced.

According to the present embodiment, when the electricity output of a certain photovoltaic cell 2a is reduced, it is possible to decrease output power VA1 of inverter 3a which receives power supply from photovoltaic cell 2a and increase the power factors of each output power VA2 and VA3 of the other inverters 3b and 3c, respectively. In this manner, each output power VA2 and VA3 of the remaining inverters 3b and 3c, respectively, can cooperate to compensate for the change in output power VA1 of inverter 3a which is in a reduced electricity output state.

Even if the electricity output of a certain photovoltaic cell 2a is reduced, the operational point (specifically, the active power, reactive power and power factor) of the sum of each output power VA1 to VA3 of inverters 3a to 3c, respectively, can be substantially the same as that before detection.

Second Embodiment

Figure 7:
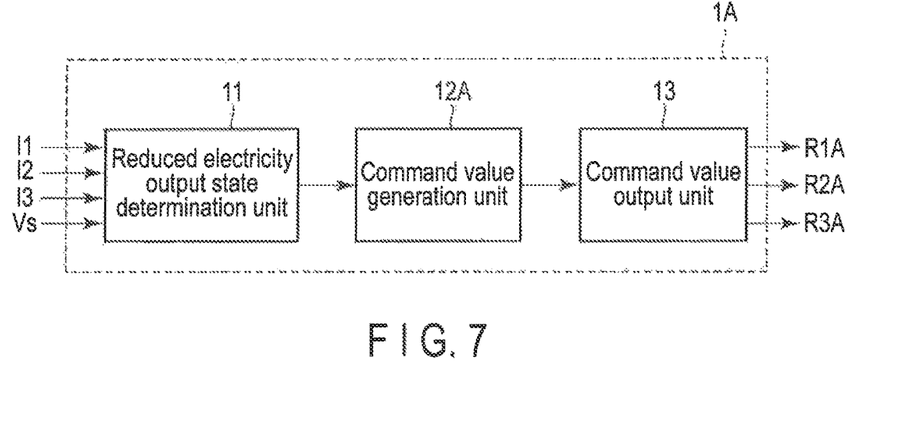
FIG. 7 is a structural diagram showing the structure of a controller according to the second embodiment of the present invention.

FIG. 7 is a structural diagram showing the structure of a controller 1A according to the second embodiment of the present invention.

In the photovoltaic system of the present embodiment, the controller 1A of the photovoltaic system 10 of the first embodiment shown in FIG. 1 is replaced by the controller 1A shown in FIG. 7. The other structures are the same as those of the photovoltaic system 10 of the first embodiment.

In the controller 1A, the command value generation unit 12 of the controller 1 of the first embodiment shown in FIG. 2 is replaced by a command value generation unit 12A. The other structures are the same as those of the controller 1 of the first embodiment. Here, portions different from those of control performed by the controller 1 of the first embodiment are mainly explained.

When none of inverters 3a to 3c is in a reduced electricity output state as a result of determination of a reduced electricity output state determination unit 11, the controller 1A controls all of inverters 3a to 3c with the same power factor in a manner similar to that of the first embodiment shown in FIG. 5.

Figure 8:
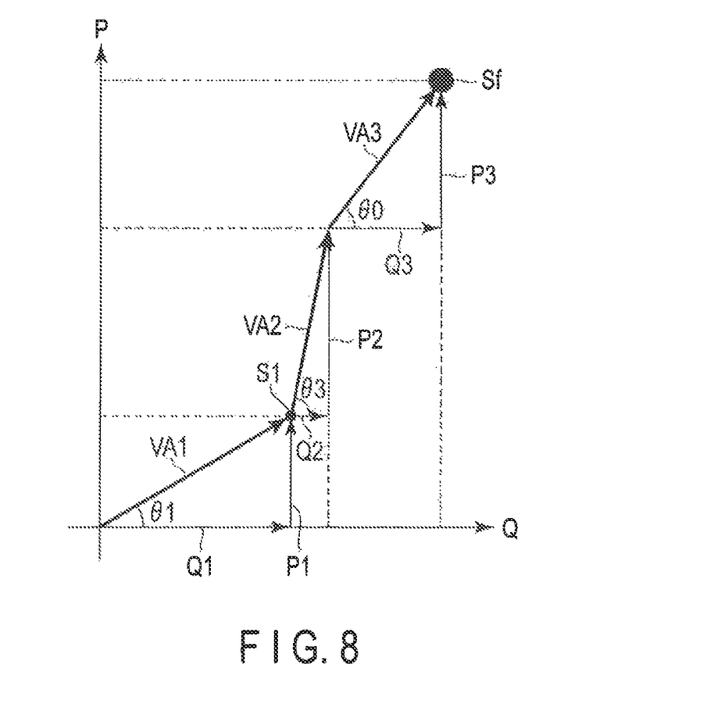
FIG. 8 is a vector diagram showing the output power of each inverter when one of the inverters is in a reduced electricity output state under control by the controller according to the second embodiment.

FIG. 8 is a vector diagram showing each output power VA1 to VA3 [VA] of inverters 3a to 3c, respectively, when inverter 3a is in a reduced electricity output state under control by the controller 1A according to the present embodiment.

The control for decreasing the power factor of the first inverter 3a in reduced electricity output state is the same as that of the first embodiment.

The command value generation unit 12A selects one of inverters 3b and 3c, which are not in a reduced electricity output state. Here, the second inverter 3b is assumed to be selected. Output power VA2 of the selected second inverter 3b is controlled so as to compensate for output power VA1 of inverter 3a. Command value R2A of the second inverter 3b is generated such that the sum of output power VA1 of the first inverter 3a in a reduced electricity output state and output power VA2 of the second inverter 3b selected for compensation is the same as that before the first inverter 3a is transitioned to a reduced electricity output state.

Specifically, command value R2A of the second inverter 3b is obtained as follows.

The power factor of the second inverter 3b is obtained such that the sum of output power VA1 and VA2 of the first inverter 3a in a reduced electricity output state and the second inverters 3b for compensation is the same as that before the first inverter 3a is transitioned to a reduced electricity output state. Thus, the operational point (specifically, the active power, reactive power and power factor) of the sum of output power VA1 and VA2 is controlled so as to be kept the same by increasing the power factor of the second inverter 3b by the decrease in the power factor of the first inverter 3a. The method of increasing the power factor is the same as that of the first embodiment shown in FIG. 4. The command value generation unit 12A generates command value R2A such that output power VA2 of the second inverter 3b is the obtained power factor.

The third inverter 3c which is not selected for compensation is controlled with the power factor which is applied before the first inverter 3a is transitioned to a reduced electricity output state. Thus, command value R3A which is generated for the third inverter 3c by the command value generation unit 12A is the same as that before the first inverter 3a is transitioned to a reduced electricity output state. If active power P2 which can be output from the second inverter 3b is not enough to compensate for the decrease in active power P1 output from the first inverter 3a, the third inverter 3c is also selected for compensation. In this case, command value R3A for the third inverter 3c is obtained in a manner similar to that of command value R2A for the second inverter 3b. By means of command value R3A, the power factor of output power VA3 of the third inverter 3c is increased so as to supplement the insufficient compensation of output power VA2 of the second inverter 3b.

According to the present embodiment, it is possible to obtain an effect similar to that of the first embodiment by decreasing the power factor of output power VA1 in a reduced electricity output state and increasing the power factor of output power VA2 of the second inverter 3b selected for compensation.

There is no need to change the power factor of output power VA3 of the third inverter 3c which is not selected for compensation. Thus, the number of inverters 3a to 3c to which control change is applied can be reduced.

It is to be noted that the present invention is not restricted to the foregoing embodiments, and constituent elements can be modified and changed into shapes without departing from the scope of the invention at an embodying stage. Additionally, various inventions can be formed by appropriately combining a plurality of constituent elements disclosed in the foregoing embodiments. For example, several constituent elements may be eliminated from all constituent elements disclosed in the embodiments. Furthermore, constituent elements in the different embodiments may be appropriately combined.

What is claimed is:

1. A photovoltaic system comprising:
   photovoltaic cells capable of outputting different direct current (DC) power at the same time, respectively;
   inverters corresponding to the photovoltaic cells, respectively;
   a reduced electricity output state determiner which determines whether each of the photovoltaic cells corresponding to the inverters is in a reduced electricity output state where an electricity output is less than a predetermined standard;
   a first command value generator which generates a first command value for decreasing a first power factor of a first inverter determined as in the reduced electricity output state by the reduced electricity output state determiner;
   a second command value generator which generates a second command value for increasing a second power factor of at least one of second inverters so as to compensate for output power of the first inverter controlled based on the first command value generated by the first command value generator, the second inverters being not determined as in the reduced electricity output state by the reduced electricity output state determiner; and
   a controller which controls the inverters based on the first command value generated by the first command value generator and the second command value generated by the second command value generator,
   wherein,
      the first command value generator generates the first command value which causes the first inverter to decrease the first power factor to maintain an electricity output which the first inverter is able to output at the moment, and
      the second command value generator generates the second command value which causes the at least one of second inverters to increase the second power factor to maintain an electricity output which the at least one of second inverters is able to output.

2. The photovoltaic system of claim 1, wherein the controller controls the inverters with the same power factor when none of the inverters is determined as in the reduced electricity output state by the reduced electricity output state determiner.

3. The photovoltaic system of claim 1, wherein the second command value generator generates the second command values for increasing the second power factors of all of the second inverters which are not determined as in the reduced electricity output state.

4. The photovoltaic system of claim 1, wherein the second command value generator increases a third power factor which is one of the second power factors of the second inverters which are not determined as in the reduced electricity output state, and when the increase in the third power factor is not enough to compensate for the output power of the first inverter, the second command value generator generates the second command value for increasing a fourth power factor other than the third power factor out of the second power factors.

5. The photovoltaic system of claim 1, wherein:
   the reduced electricity output state determiner determines the reduced electricity output state based on active power which the inverters output, respectively.

6. A controller of a photovoltaic system, the photovoltaic system including photovoltaic cells capable of outputting different DC power at the same time, respectively, and inverters corresponding to the photovoltaic cells, respectively, the controller comprising:
   a reduced electricity output state determiner which determines whether each of the photovoltaic cells corresponding to the inverters, respectively, is in a reduced electricity output state where an electricity output is less than a predetermined standard;
   a first command value generator which generates a first command value for decreasing a first power factor of a first inverter determined as in the reduced electricity output state by the reduced electricity output state determiner; and
   a second command value generator which generates a second command value for increasing a second power factor of at least one of second inverters so as to compensate for output power of the first inverter controlled based on the first command value generated by the first command value generator, the second inverters being not determined as in the reduced electricity output state by the reduced electricity output state determination unit;
   wherein,
      the inverters are controlled based on the first command value generated by the first command value generator and the second command value generated by the second command value generator,
      the first command value generator generates the first command value which causes the first inverter to decrease the first power factor to maintain an electricity output which the first inverter is able to output at the moment, and
      the second command value generator generates the second command value which causes the at least one of second inverters to increase the second power factor to maintain an electricity output which the at least one of second inverters is able to output.

7. The controller of claim 6, wherein:
   the reduced electricity output state determiner determines the reduced electricity output state based on active power which the inverters output, respectively.

8. A control method of a photovoltaic system, the photovoltaic system including photovoltaic capable of outputting different DC power at the same time, respectively, and inverters corresponding to the photovoltaic cells, respectively, the method comprising:
   determining whether each of the photovoltaic cells corresponding to the inverters, respectively, is in a reduced electricity output state where an electricity output is less than a predetermined standard;
   generating a first command value for decreasing a first power factor of a first inverter determined as in the reduced electricity output state;
   generating a second command value for increasing a second power factor of at least one of second inverters so as to compensate for output power of the first inverter controlled based on the first command value, the second inverters being not determined as in the reduced electricity output state; and
   controlling the inverters based on the first command value and the second command value, wherein,
the first command value generator generates the first command value which causes the first inverter to decrease the first power factor to maintain an electricity output which the first inverter is able to output at the moment, and
the second command value generator generates the second command value which causes the at least one of second inverters to increase the second power factor to maintain an electricity output which the at least one of second inverters is able to output.

9. The control method of claim 8, wherein:
determining the reduced electricity output state is based on active power which the inverters output, respectively.

\* \* \* \* \*